United States Patent [19]

Nishio

[11] Patent Number: 5,194,977
[45] Date of Patent: Mar. 16, 1993

[54] WAVELENGTH DIVISION SWITCHING SYSTEM WITH REDUCED OPTICAL COMPONENTS USING OPTICAL SWITCHES

[75] Inventor: Makoto Nishio, Tokyo, Japan

[73] Assignee: NEC Corporation, Tokyo, Japan

[21] Appl. No.: 616,046

[22] Filed: Nov. 20, 1990

[30] Foreign Application Priority Data

Nov. 20, 1989 [JP] Japan .................................. 1-302703
Dec. 21, 1989 [JP] Japan .................................. 1-334343

[51] Int. Cl.$^5$ ........................................... H04J 14/02
[52] U.S. Cl. .................................... 359/128; 359/123
[58] Field of Search ............... 359/123, 124, 128, 139, 359/117

[56] References Cited

U.S. PATENT DOCUMENTS 4,989,199 1/1991 Rzeszewski ..................... 359/123
5,005,166 5/1991 Suzuki et al. .................... 359/123

Primary Examiner—Edward L. Coles, Sr.
Assistant Examiner—R. Bacares
Attorney, Agent, or Firm—Sughrue, Mion, Zinn, Macpeak & Seas

[57] ABSTRACT

In a wavelength division switching system having $m_1$ inlet highways and $m_2$ outlet highways, $m_1$ splitters are coupled respectively to the inlet highways to split each multiplex signal into $m_2 \times n$ output signals for coupling to respective inputs of $m_2 \times n$ optical switches. Each optical switch is responsive to a switching control signal for coupling one of its inputs to one of $m_2 \times n$ tunable wavelength filters capable of passing one of n different wavelengths, in response to a wavelength selecting signal, to one of $m_2 \times n$ fixed wavelength converters which are organized into $m_2$ groups. These wavelength converters provide conversion of the input signals so that the converted wavelength is unique in each of the $m_2$ groups. An array of $m_2$ combiners are respectively associated with the groups of the fixed wavelength converters and with the outlet highways. Each combiner has n inputs coupled respectively to the outputs of the fixed wavelength converters of the associated group to multiplex signals appearing at the n inputs thereof for coupling to the associated outlet highway.

6 Claims, 10 Drawing Sheets

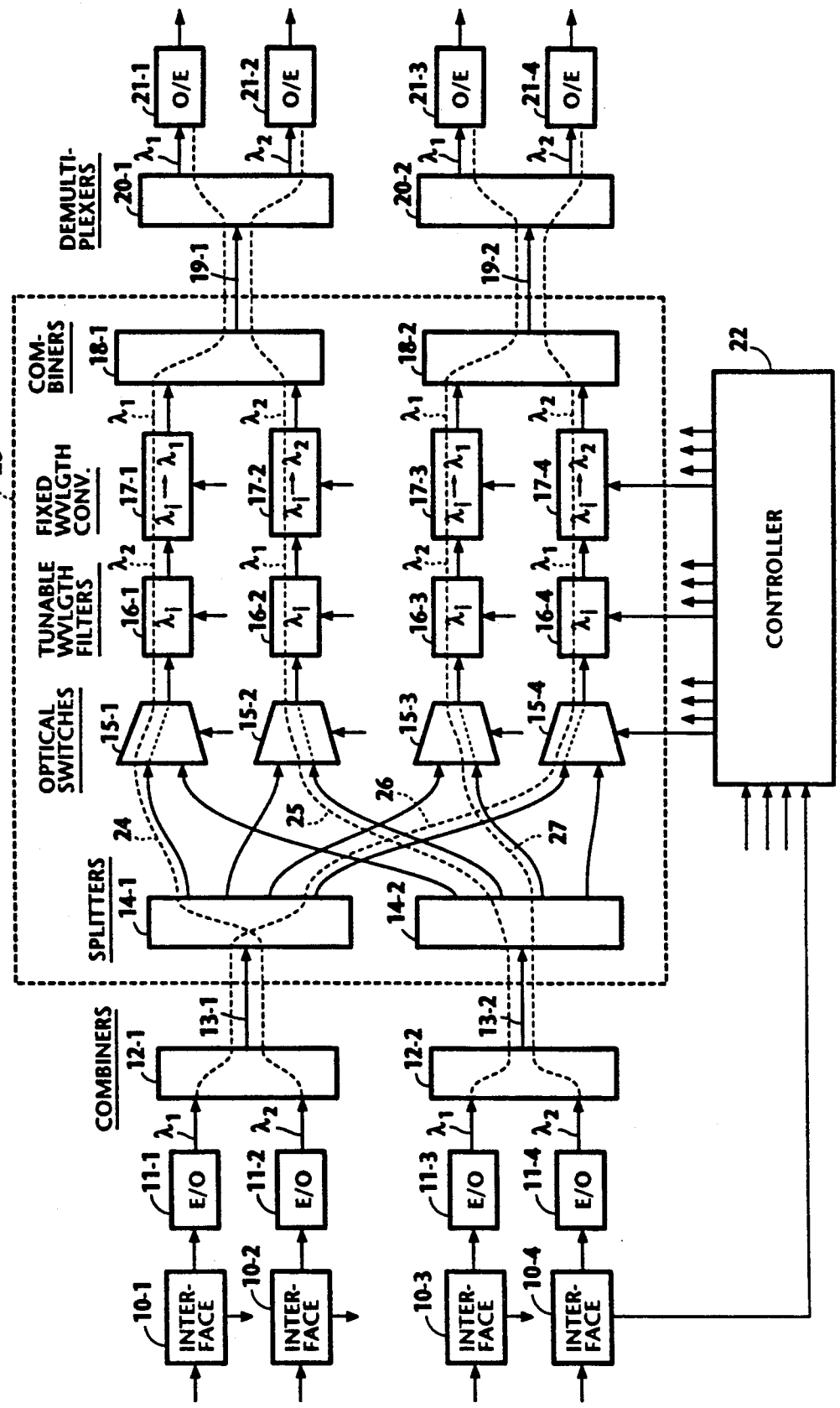

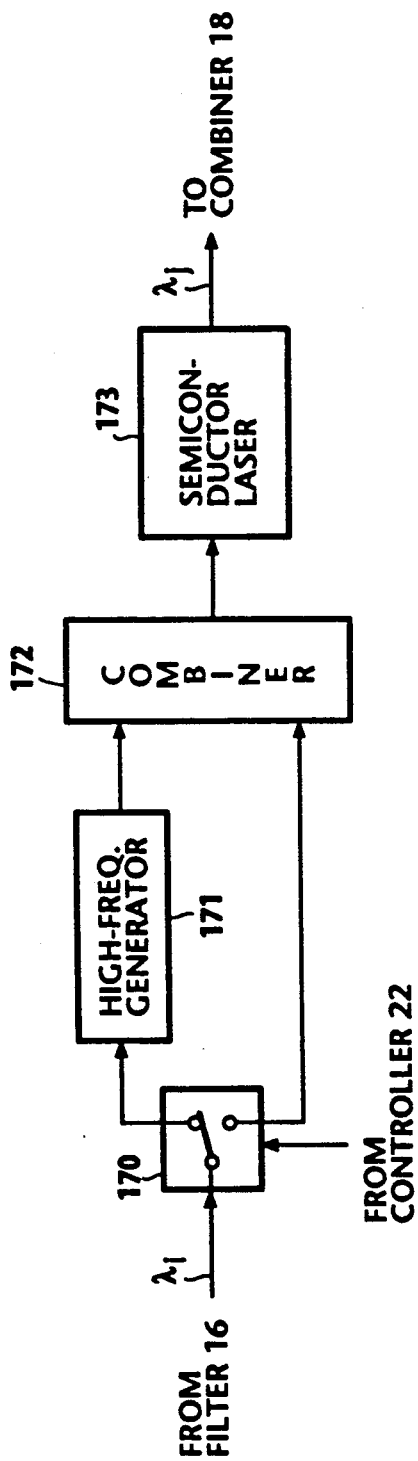
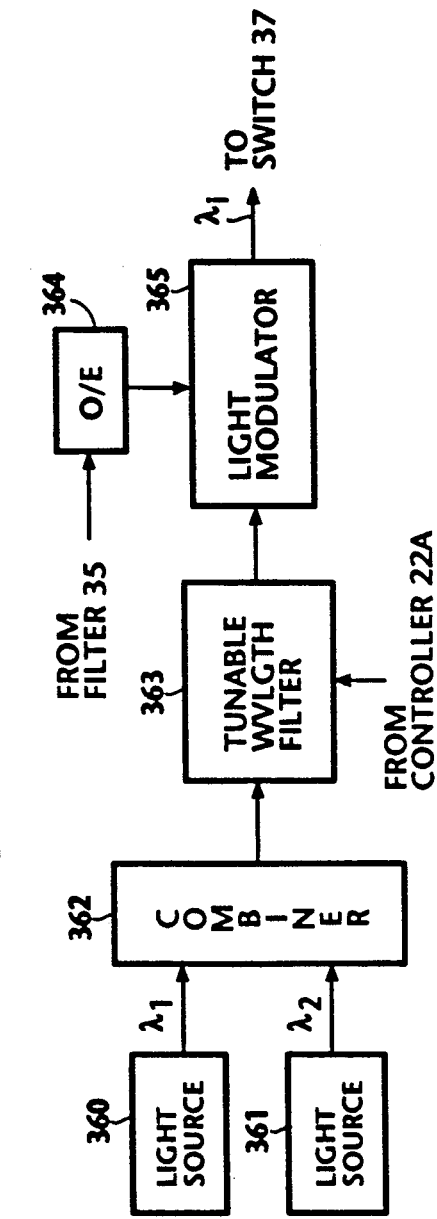

5,194,977

WAVELENGTH DIVISION SWITCHING SYSTEM WITH REDUCED OPTICAL COMPONENTS USING OPTICAL SWITCHES

BACKGROUND OF THE INVENTION

The present invention relates generally to telecommunication switching systems, and more specifically to a wavelength division optical switching system.

Optical switching systems using wavelength division techniques are known, and widespread use of this type of systems is expected as it holds many beneficial features over electronic versions. However, wavelength division switching systems which have been proposed so far are generally of multi-stage configuration. Since this configuration requires many costly optical components, it has been desired to develop a system requiring a small number of optical components.

SUMMARY OF THE INVENTION

It is therefore an object of the present invention to provide a wavelength division switching system with reduced optical components by a single-stage configuration.

According to a first aspect of the present invention, there is provided a wavelength division switching system which comprises $m_1$ inlet highways and $m_2$ outlet highways. An array of $m_1$ splitters are coupled respectively to the inlet highways to split each multiplex signal on the inlet highways into $m_2 \times n$ output signals of equal optical energy, (where n represents the number of wavelengths multiplexed into the signal) and these output signals are supplied to respective inputs of $m_2 \times n$ optical switches. Each optical switch is responsive to a switching control signal applied thereto for coupling one of its inputs to an output thereof. An array of $m_2 \times n$ tunable wavelength filters are coupled respectively to the outputs of the optical switches, each of the tunable wavelength filters being capable of passing one of n different wavelengths to an output thereof in response to a wavelength selecting signal applied thereto. An array of $m_2 \times n$ fixed wavelength converters are provided which are organized into $m_2$ groups. These wavelength converters are respectively coupled to the outputs of the tunable wavelength filters for converting the wavelength of signal applied thereto so that the converted wavelength is unique in each of the $m_2$ groups. An array of $m_2$ combiners are respectively associated with the groups of the fixed wavelength converters and with the outlet highway. Each combiner has n inputs coupled respectively to the outputs of the fixed wavelength converters of the associated group to multiplex signals appearing at the n inputs thereof for coupling to the associated outlet highway.

According to a second aspect of this invention, there is provided a wavelength division switching system in which $m_1$ splitters are coupled respectively to the inlet highways to split each multiplex signal on the inlet highways into $m_2 \times n$ output signals of equal optical energy for coupling to $m_1 \times n$ fixed wavelength filters each being capable of passing one of n different wavelengths to an output thereof so that it is unique in each of the groups. An array of $m_1 \times n$ tunable wavelength filters are coupled respectively to the outputs of the fixed wavelength filters, each of the tunable wavelength filters being capable of passing one of the wavelengths to an output thereof in response to a wavelength selecting signal applied thereto. An array of $m_1 \times n$ optical switches are respectively coupled to the outputs of the tunable wavelength filters for coupling a signal supplied thereto to one of $m_2$ outputs thereof in response to a switching signal applied thereto. An array of $m_2$ combiners are respectively associated with the outlet highways. Each combiner has $m_1 \times n$ inputs coupled to respective outputs of the optical switches for multiplexing signals appearing at the $m_1 \times n$ inputs thereof for coupling to the associated outlet highway.

According to a third aspect, the wavelength division switching system of the invention comprises $m_1 \times n$ input terminals for receiving optical signals from incoming optical transmission channels and $m_2 \times n$ output terminals for delivering optical signals to outgoing transmission channels. An array of $m_1 \times n$ wavelength converters are provided which are organized into $m_1$ groups, the wavelength converters being coupled respectively to the input terminals of the system for converting the wavelengths of the optical signals to one of n different wavelengths so that the converted wavelength is unique in each of the $m_1$ groups. An array of $m_1$ star couplers are coupled to the wavelength converters, and $m_2 \times m_1$ splitters are organized into $m_2$ groups. The splitters of each group are coupled to the star couplers respectively to apply signals therefrom to respective inputs of n switches of an array of $m_2 \times n$ optical switches in response to a switching signal applied thereto. An array of $m_2 \times n$ tunable wavelength converters are coupled respectively between the outputs of the optical switches and the output terminals of the system. Each tunable wavelength converter is capable of converting the wavelength of a signal supplied thereto in response to a control signal applied thereto.

According to a fourth aspect, the wavelength division switching system of the invention comprises $m_1 \times n$ input terminals for receiving optical signals from incoming transmission channels and $m_2 \times n$ output terminals for delivering optical signals to outgoing transmission channels. An array of $m_1 \times n$ tunable wavelength converters are organized into $m_1$ groups and coupled respectively to the input terminals of the system for converting the wavelengths of the optical signals to one of n different wavelengths in response to a control signal applied thereto, the converted wavelength being unique in each of the $m_1$ groups. An array of $m_1 \times n$ optical switches are organized into $m_1$ groups and coupled respectively to the tunable wavelength converters, each of the optical switches coupling an optical signal supplied thereto to one of $m_2$ outputs thereof in response to a switching signal applied thereto. An array of $m_1 \times m_2$ combiners are organized into $m_1$ groups associated respectively with the groups of the optical switches. Each combiner has n inputs coupled to respective outputs of the optical switches of the associated group and has one output coupled to one of $m_2$ star couplers and thence to $m_2 \times n$ wavelength filters, which are organized into $m_2$ groups associated respectively with the star couplers and with $m_2$ groups of the output terminals. The wavelength filters of each group are coupled respectively between the associated star coupler and the output terminals of the associated group for passing one of the n different wavelengths to the output terminal.

BRIEF DESCRIPTION OF THE DRAWINGS

The present invention will be described in further detail with reference to the accompanying drawings, in which:

FIG. 2 is a block diagram of the wavelength division switching system according to a first embodiment of the present invention;

FIG. 3 is a block diagram of the fixed wavelength converter of FIG. 1;

FIG. 6 is a block diagram of the tunable wavelength converter of FIG. 5;

DETAILED DESCRIPTION

Figure 1:
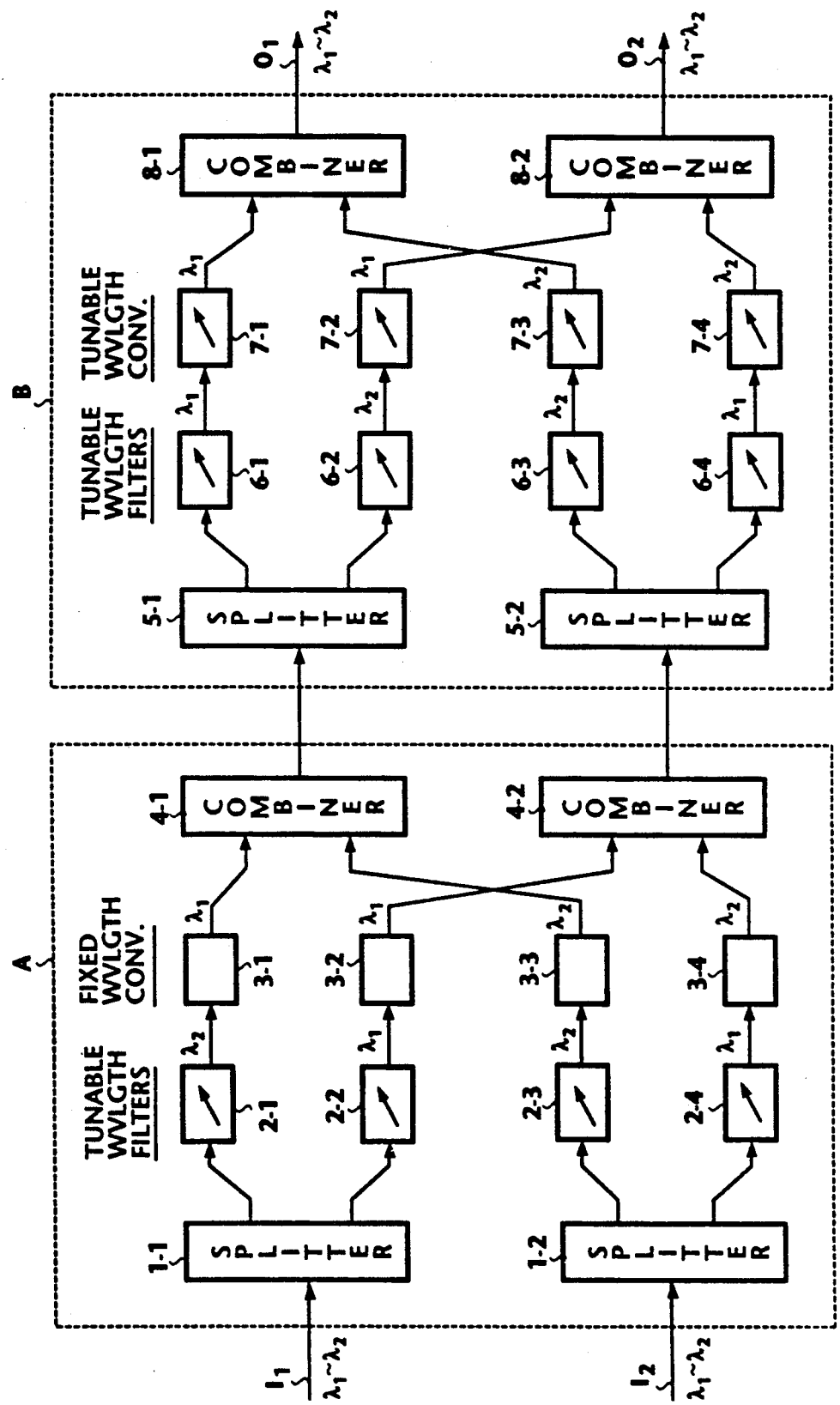
FIG. 1 is a block diagram of a prior art wavelength division switching system.

Before going into the details of the present invention, it is appropriate to briefly describe a prior art wavelength switching system with reference to FIG. 1. The system is illustrated in a simplest form as consisting of a 4×4 network using two stages A and B and two wavelengths multiplexed on inlet highways $I_1$ and $I_2$ and outlet highways $O_1$ and $O_2$. The primary stage A comprises splitters 1-1 and 1-2 respectively coupled to the inlet highways $I_1$ and $I_2$ on each of which incoming optical signals of wavelengths $\lambda_1$ and $\lambda_2$ multiplexed. The incoming multiplex signal on highway $I_1$ is coupled by splitter 1-1 to tunable wavelength filters 2-1 and 2-2 which are controlled by a controller to pass those wavelengths of the incoming signals which are uniquely determined by the controller, e.g., $\lambda_2$ and $\lambda_1$. The outputs of these filters are supplied to fixed wavelength converters 3-1 and 3-2, respectively, in which the input signals are converted to preassigned fixed wavelengths $\lambda_1$ and respectively passed to combiners 4-1 and 4-2. Likewise, the signal on highway $I_2$ is coupled by splitter 1-2 to tunable wavelength filters 2-3 and 2-4 in which they are converted to wavelengths $\lambda_2$ and $\lambda_1$ and supplied to fixed wavelength converters 3-3 and 3-4 and converted to preassigned fixed wavelengths $\lambda_2$ and respectively passed to combiners 4-1 and 4-2 in which they are multiplexed with different wavelengths. The secondary stage B includes splitters 5-1 and 5-2 to respectively couple signals from combiners 4-1 and 4-2 to tunable wavelength filters 6-1–6-4, which are controlled to pass those wavelengths of the incoming multiplex signals which are also uniquely determined by the controller as in the case of filters 2. The wavelengths of signals from filters 6-1–6-4 are switched to either $\lambda_1$ or $\lambda_2$ by tunable wavelength converters 7-1–7-4 and supplied to respective inputs of combiners 8-1 and 8-2. By appropriately controlling filters 2-i, 6-i and converters 7-i, a signal appearing on the inlet highways is transmitted to a desired outlet highway.

If the prior art system is made up of (m×n) input lines and (m×n) output lines, or what is called a "(m×n)×(m×n)" network configuration, with a level 2 of wavelength multiplexity, the number of required optical devices such as tunable and fixed wavelength filters and tunable wavelength converters is equal to 4×m×n. The present invention is intended to reduce this number.

Referring now to FIG. 2, there is shown a wavelength division switching system according to a first embodiment of the invention. The system of this invention is essentially a single-stage wavelength division switching system by the use of an array of optical switches. The first embodiment of this invention is shown in a simplified form as comprising four input lines, four output lines and two wavelengths, namely the system is a 4×4 network with a wavelength multiplexity of level 2. The input lines are coupled respectively to interfaces 10-1–10-4 which supply information signals to associated electrooptic converters 11-1–11-4, respectively, and control signals to a controller 22 which generates a set of switching signals. The E/O converters 11-1 and 11-2 provides electrooptical conversion of their incoming electric signals into optical signals of wavelengths $\lambda_1$ and $\lambda_2$ which are unique to the group of converters 11-1 and 11-2, and E/O converters 11-3 and 11-4 likewise convert their incoming signals into signals of wavelengths $\lambda_1$ and $\lambda_2$ which are unique to the group of converters 11-3 and 11-4.

The outputs of E/O converters 11-1 and 11-2 are coupled to a combiner 12-1 in which they are combined at the input end of an optical waveguide, or inlet highway 13-1. The output end of inlet highway 13-1 is connected to a splitter 14-1 which forms part of a wavelength division switching system 23. The energy of the wavelength-division multiplexed signal on highway 13-1 is equally split by splitter 14-1 and made to appear at the first input of optical switches 15-1–15-4. Similarly, the outputs of E/O converters 11-3 and 11-4 are coupled to a combiner 12-2 in which they are combined at the input end of an inlet highway 13-2, whose output end is connected to a splitter 14-2, in which the optical multiplex signal on highway 13-2 is equally split and made to appear at the second input of optical switches 15-1–15-4.

Optical switches 15 are respectively controlled by a highway selecting signal from controller 22 to select one of the multiplex signals of inlet highways 13-1 and 13-2. Tunable wavelength filters 16-1–16-4 are respectively connected to the output of optical switches 15-1–15-4. In response to a wavelength selecting signal supplied from controller 22, each of these tunable wavelength filters selects one of the wavelength signals $\lambda_1$ and $\lambda_2$ of the multiplex signal which is selected by switch 15.

The outputs of wavelength filters 16-1–16-4 are coupled respectively to fixed wavelength converters 17-1–17-4. These wavelength converters provide wavelength conversion of their incident optical signals to a preassigned wavelength. In the illustrated embodiment, fixed wavelength converters 17-1 and 17-2 are preassigned wavelengths $\lambda_1$ and $\lambda_2$, respectively, and wavelength converters 17-3 and 17-4 are preassigned $\lambda_1$ and $\lambda_2$, respectively. The wavelengths assigned to converters 17-1 and 17-2 are unique to each other, those assigned to converters 17-3 and 17-3 being also unique to each other.

As shown in FIG. 3, each wavelength converter 17-*i* comprises an optical switch 170 to which the output of associated wavelength filter 16-*i* is connected. Switch 170 has two output terminals, one being coupled to a high-frequency generator 171 formed of a nonlinear optical crystal such as $LiNbO_3$ in which it is converted to a shorter wavelength and fed to a combiner 172, and the other being coupled direct to combiner 172. The output of combiner 172 is applied to an injection type semiconductor laser 173, such as planer stripe type double heterostructure, to emit a laser beam of a preassigned output wavelength $\lambda_j$ to combiner 18 if the wavelength of the signal incident thereon is shorter than the output wavelength $\lambda_j$. Optical switch 170 is supplied with a control signal from controller 22 to apply the incident optical signal of wavelength $\lambda_i$ to laser diode 171 if wavelength $\lambda_i$ is longer than output wavelength $\lambda_j$ of semiconductor laser 173 or direct to combiner 172 if wavelength $\lambda_i$ is shorter than wavelength $\lambda_j$.

In a manner similar to that described in U.S. Pat. No. 4,841,519, assigned to the same assignee as the present invention, controller 22 provides switching control over optical switches 15, wavelength filters 16 and wavelength converters 17, using source and destination information supplied from the incoming lines and trunks as well as from the current statuses of the constituents of the system.

The outputs of wavelength converters 17-1 and 17-2 are multiplexed by a combiner 18-1 and appear at the input end of an outlet highway 19-1. Likewise, the outputs of wavelength converters 17-3 and 17-4 are multiplexed by a combiner 18-2 and appear at the input end of an outlet highway 19-2.

The output end of outlet highway 19-1 is coupled to a demultiplexer 20-1 in which the multiplex signal is decomposed into individual wavelength components $\lambda_1$ and $\lambda_2$. These wavelength components are respectively supplied to associated optoelectrical converters 21-1 and 21-2 which are respectively assigned unique wavelengths $\lambda_1$ and $\lambda_2$ to convert the incident optical signals to electric signals for application to associated outgoing lines and trunks. Likewise, the output end of outlet highway 19-2 is coupled to a demultiplexer 20-2 in which the multiplex signal is decomposed into individual wavelength components $\lambda_1$ and $\lambda_2$ for coupling to associated optoelectrical converters 21-3 and 21-4. $\lambda_2$ The operation of the first embodiment of this invention is as follows. Assume that it is desired to transmit optical signals from E/O converters 11-1 and 11-2 to O/E converters 21-4 and 21-1, respectively, and transmit signals from E/O converters 11-3 and 11-4 to O/E converters 21-2 and 21-3, respectively. Controller 22 applies a switching signal to switch 15-1 to cause it to establish a path from inlet highway 13-1 to wavelength filter 16-1, applies a wavelength selecting signal to filter 17-1 to select $\lambda_2$ and applies a control signal to wavelength converter 17-1 to convert the $\lambda_2$ to $\lambda_1$, thus coupling E/O converter 11-2 to O/E converter 21-1 as indicated by a dotted line 24. In a similar manner, switch 15-2 is controlled to establish a path from inlet highway 13-2 to wavelength filter 16-2 and filter 16-2 is controlled to select $\lambda_1$, which is converted to $\lambda_2$ by converter 17-2, coupling E/O converter 11-3 to O/E converter 21-2 as indicated by a dotted line 25. Switch 15-3 is controlled to establish a path from inlet highway 13-2 to wavelength filter 16-3, which is controlled to select $\lambda_2$, the latter being converted to $\lambda_1$ by converter 17-3, coupling E/O converter 11-4 to O/E converter 21-3 as indicated by a dotted line 26. Switch 15-4 is controlled to establish a path from inlet highway 13-1 to wavelength filter 16-4, which is controlled to select $\lambda_1$, the latter being converted to $\lambda_2$ by converter 17-4, thus coupling E/O converter 11-1 to O/E converter 21-4 as indicated by a dotted line 27.

Figure 4:
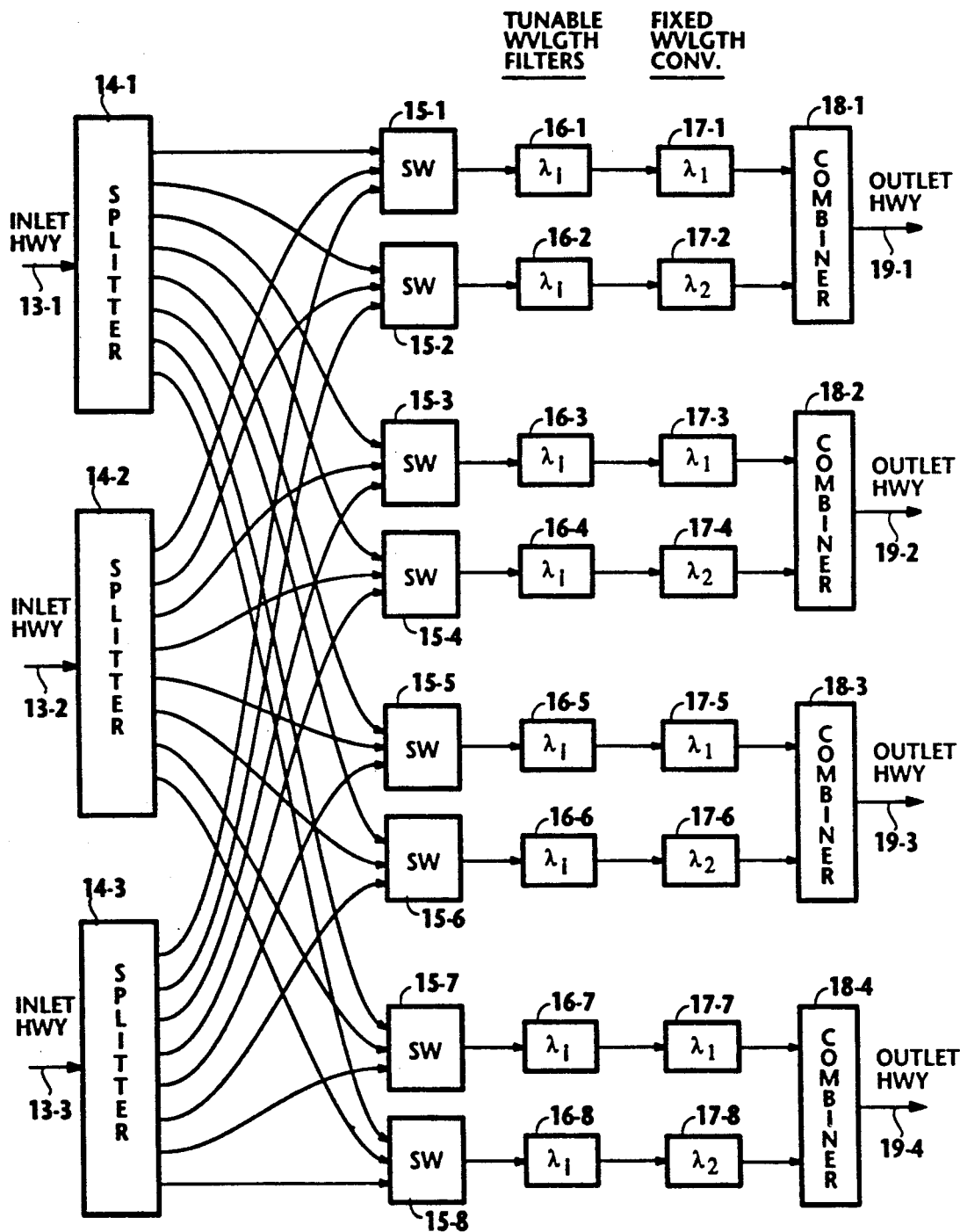
FIG. 4 is a block diagram of a 6×8 network of the first embodiment.

If the wavelength switching system of FIG. 2 has $m \times n$ input lines and $m \times n$ output lines, (where m represent the number of highways on each of the inlet and outlet sides of the system, and n represents the level of wavelength multiplexity) the number of optical devices such as tunable wavelength filters 16 and wavelength converters 17 is equal to $2 \times m \times n$ (=8), which is smaller than that required with the known wavelength switching system of FIG. 1. While the system of FIG. 2 employs the same number of highways on each side of the system, it is possible to use a different number of highways as illustrated in FIG. 4. This system is a $6 \times 8$ network with a wavelength multiplexity of level 2, namely, $m_1$ (=the number of inlet highways)=3, $m_2$ (=the number of outlet highways)=4. Thus, splitters 14-1 through 14-3 are coupled respectively to inlet highways 13-1-13-3 to apply their respective incoming signals to $m_2 \times n$ (=8) waveguides which lead to respective input terminals of optical switches 15-1-15-8, whose outputs are coupled to tunable wavelength filters 16-1-16-8 and thence to wavelength converters 17-1-17-8. Combiners 18-1-18-4 are associated respectively with $m_2$ groups of wavelength converters 17-i and 17-(i+1). Each combiner 18 has n input terminals coupled to the outputs of the wavelength converters of the associated group. In the $6 \times 8$ network, sixteen (=$2 \times 4 \times 2$) optical devices are required. It is seen that with a $(m_1 \times n) \times (m_2 \times n)$ network, the number of tunable wavelength filters 16 and wavelength converters 17 is equal to $2 \times m_2 \times n$.

Another advantage of the present invention is that, since all wavelengths carried on each inlet highway can simultaneously access to all optical switches, signal from any of the input lines of the system can be transmitted to all output lines in what is called a broadcast mode. For example, $\lambda_1$ on inlet highway 13-1 can be transmitted on a broadcast mode by coupling the upper position of all switches 15 to their output terminals, selecting $\lambda_2$ by all wavelength filters 16 and converting the wavelengths of the outputs of filters 16-1, 16-2, 16-3 and 16-4 to $\lambda_1$, $\lambda_2$, $\lambda_1$, and $\lambda_2$ by wavelength converters 17-1, 17-2, 17-3 and 17-4, respectively.

Figure 5:
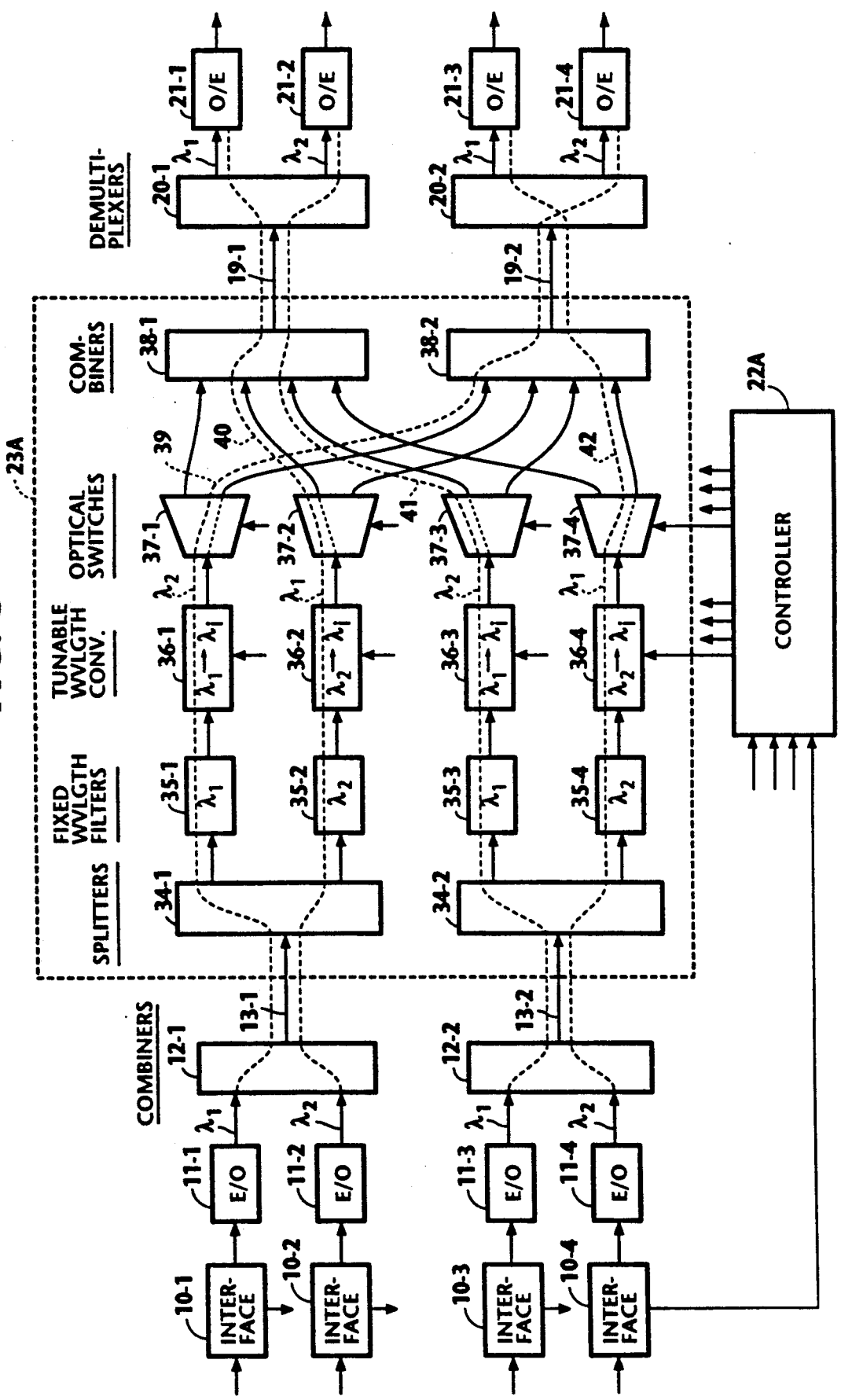
FIG. 5 is a block diagram of the wavelength division switching system of a second embodiment of this invention.

A second embodiment of the present invention is shown in FIG. 5 in which parts corresponding to those in FIG. 2 are marked with the same numerals as used in FIG. 2. This embodiment differs from the first embodiment in that the switching system shown at 23A comprises splitters 34-1 and 34-2 coupled respectively to inlet highways 13-1 and 13-2. Splitter 34-1 splits the energy of the signal from highway 13-1 for coupling to fixed wavelength filters 35-1 and 35-2, and splitter 34-2 splits the energy of signal from highway 13-2 for coupling to fixed wavelength filters 35-3 and 35-4. Wavelength filters 35 of this type are only capable of passing a preassigned wavelength. In the illustrated embodiment, the wavelengths $\lambda_1$ and $\lambda_2$ of each signal from splitter 34-1 are passed through filters 35-1 and 35-2, respectively. Likewise, the $\lambda_1$ and $\lambda_2$ components of each signal from splitter 34-2 are passed through filters 35-3 and 35-4, respectively. The outputs of filters 35-1–35-4 are connected to tunable wavelength converters 36-1–36-4, respectively, which are capable of converting the wavelengths of these outputs to desired wavelengths $\lambda_1$ in response to a wavelength switching signal supplied from controller 22A.

As shown in detail in FIG. 6, each tunable wavelength converter 36-i comprises light sources 360 and 361 for emitting constant intensity light beams of wavelengths $\lambda_1$ and $\lambda_2$ to a combiner 362 in which they are multiplexed and fed to a tunable wavelength filter 363 which is controlled by controller 22A to select one of the wavelengths of the multiplexed signal. The optical signal from the associated fixed wavelength filter 35-i is applied to an optoelectric converter 364 in which it is converted to an electric signal and fed to a light modulator 365 to provide intensity modulation on the output light of wavelength filter 363. In this way, the wavelength of incident light from filter 35-i is converted to a desired wavelength $\lambda_i$.

Returning to FIG. 5, the outputs of tunable wavelength filters 36-1–36-4 are coupled to optical switches 37-1–37-4, respectively, which are also controlled by a switching signal from controller 22A. Each optical switch 37 has two output terminals which are respectively coupled to combiners 38-1 and 38-2, whose outputs are in turn connected to outlet highways 19-1 and 19-2.

The switching system of FIG. 5 operates as follows. Assume that it is desired to transmit signals from input lines to output lines in the same manner as that described with reference to FIG. 2. Tunable wavelength converters 36-1 and 36-2 are controlled so that wavelength $\lambda_1$ of output from filter 35-1 is converted to $\lambda_2$ and wavelength $\lambda_2$ of output from filter 35-2 is converted to $\lambda_1$. Converters 36-3 and 36-4 are controlled so that wavelengths $\lambda_1$ and $\lambda_2$ of outputs from filters 35-3 and 35-4 are converted respectively to wavelengths $\lambda_2$ and $\lambda_1$. Switches 37-1 and 37-2 are controlled to the output of converters 36-1 and 36-2 to combiners 38-2 and 38-1, respectively, and switches 37-3 and 37-4 are controlled to the output of converters 36-3 and 36-4 to combiners 38-1 and 38-2, respectively. Therefore, a path indicated by a dotted line 39 is established between converters 11-1 and 21-4, a path 40 is established between converters 11-2 and 21-1. A path 41 is established between converters 11-3 and 21-2, and a path 42 between converters 11-4 and 21-3. The number of optical devices such as fixed wavelength filters 35 and tunable wavelength converters 36 is equal to $2 \times m \times n (=8)$ as in the previous embodiment. In a $(m_1 \times n) \times (m_2 \times n)$ network, the number of these optical devices is equal to $2 \times m_1 \times n$. Thus, in a $6 \times 8$ network, twelve $(=2 \times 3 \times 2)$ optical devices are required.

Figure 7:
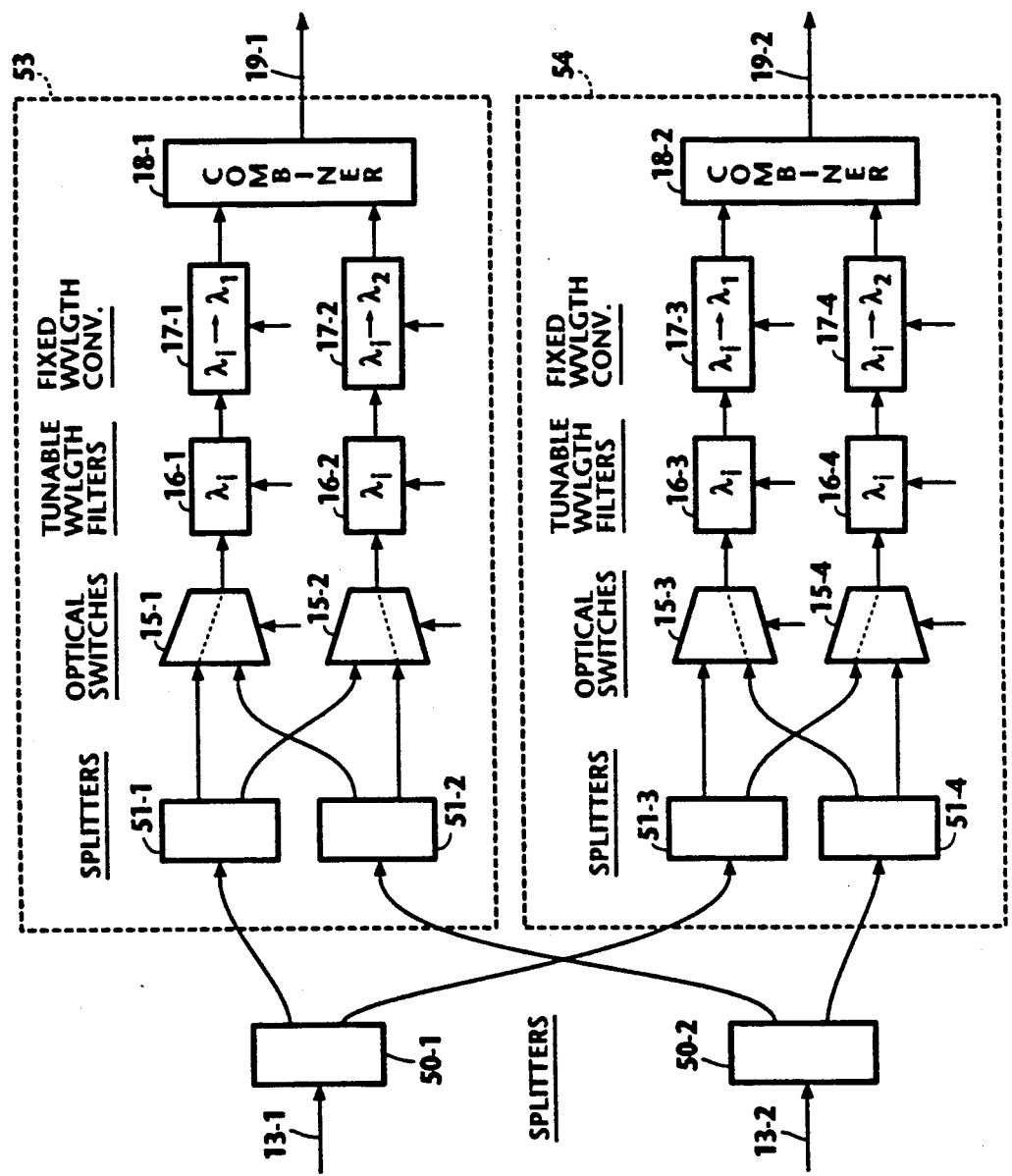
FIG. 7 is a block diagram of the wavelength division switching system of a third embodiment of this invention.

A third embodiment of this invention is shown in FIG. 7 in which parts corresponding to those in FIG. 2 are marked with the same numerals as in FIG. 2. This embodiment is a modification of the first embodiment to provide modularity of the system with basic building blocks. The system is divided into two switching modules 53 and 54 of identical construction. Splitters 50-1 and 50-2 are provided outside of the modules to respectively apply the wavelength multiplexed signals on inlet highways 13-1, 13-2 to both switching modules 53 and 54. Switching module 53 includes splitters 51-1 and 51-2 for receiving the signals of inlet highways 13-1 and 13-2, respectively. Optical switches 15-1, 15-2, wavelength filters 16-1, 16-2 and wavelength converters 17-1 and 17-2 are all organized into the module 53, and optical switches 15-3, 15-4, wavelength filters 16-3, 16-4 and wavelength converters 17-3 and 17-4 are all organized into the module 54. Each of the splitters 51-1, 51-2 has two outputs coupled to respective input terminals of optical switches 15-1 and 15-2. Likewise, switching module 54 includes splitters 51-3 and 51-4 for receiving the signals of inlet highways 13-1 and 13-2, respectively, and coupling them to optical switches 15-3 and 15-4. It is seen that the $1 \times 4$ splitter 14-1 of the first embodiment correspond to $1 \times 2$ splitters 50-1, 51-1 and 51-3, and the $1 \times 4$ splitter 14-2 corresponds to $1 \times 2$ splitters 50-2, 51-2 and 51-4. Because of this modularity, splitters 50-1, 50-2 can be located remote from switching modules 53, 54 without considerably increasing the amount of waveguides between them.

Figure 8:
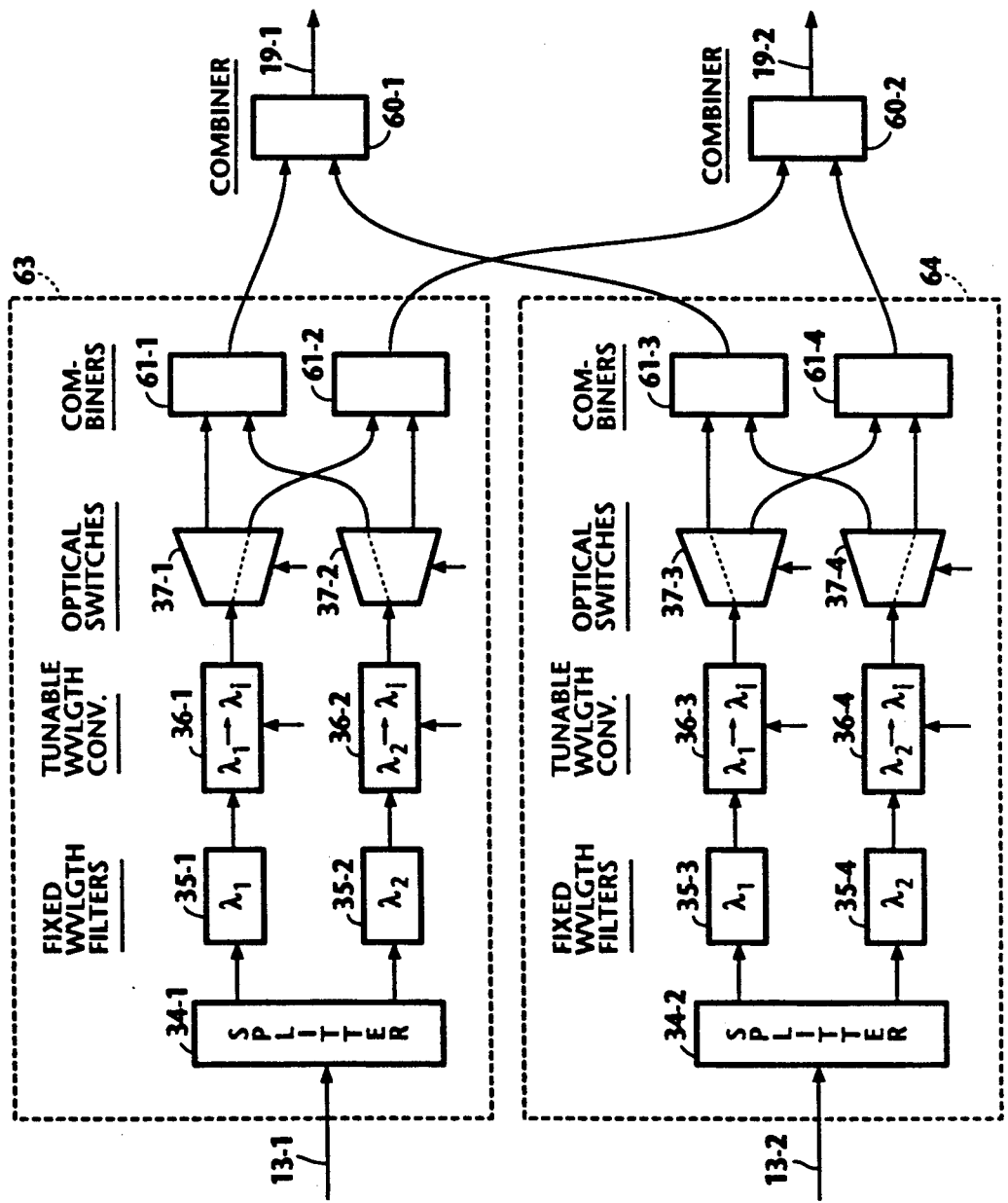
FIG. 8 is a block diagram of the wavelength division switching system of a fourth embodiment of this invention.

Similar modularity can be achieved with respect to the second embodiment as shown in FIG. 8, in which parts corresponding to those in FIG. 5 are marked with the same numerals as in FIG. 5. In this fourth embodiment, the $4 \times 1$ combiner 38-1 of FIG. 5 is divided into three $2 \times 1$ combiners 60-1, 61-1 and 61-3 and the $4 \times 1$ combiner 38-1 is divided into three $2 \times 1$ combiners 60-2, 61-2 and 61-4. Combiners 61-1 and 61-2 each have two inputs coupled to respective outputs of optical switches 37-1 and 37-2 to form a switching module 63 with splitter 34-1, filters 35-1, 35-2, and wavelength converters 36-1, 36-2, and combiners 61-3 and 61-4 have two inputs coupled to respective outputs of optical switches 37-3 and 37-24 to form a switching module 64 with splitter 34-2, filters 35-3, 35-4, and wavelength converters 36-3, 36-4. This embodiment allows switching modules 63 and 64 to be located remote from combiners 60-1 and 60-2 without considerably increasing the amount of waveguides between them.

Figure 9:
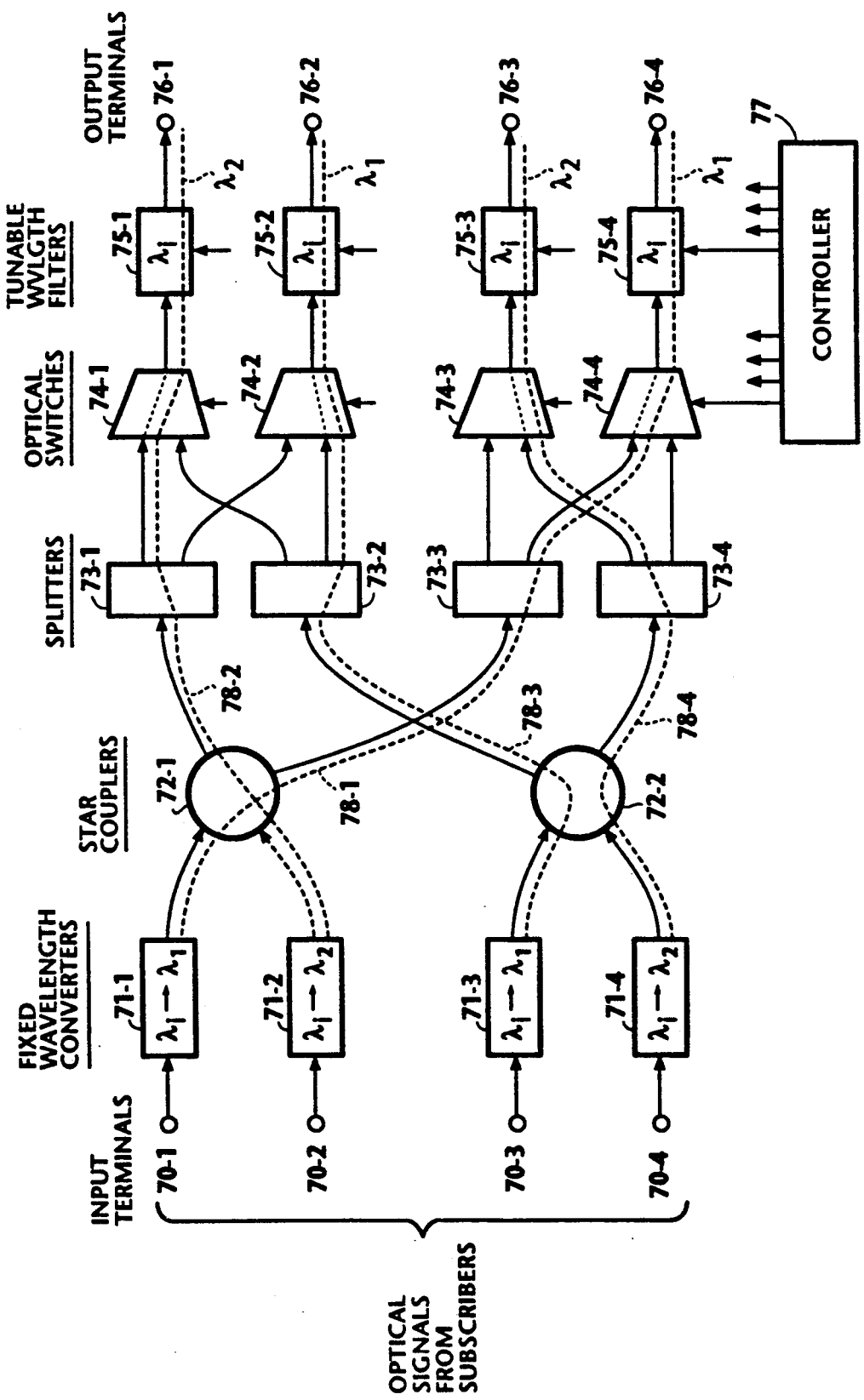
FIG. 9 is a block diagram of the wavelength division switching system of a fifth embodiment of this invention.

A fifth embodiment of the present invention is shown in FIG. 9. In this embodiment, the switching system is also a $4 \times 4$ network with a wavelength nultiplexity of level 2 as in the previous embodiments, but provides direct switching of optical signals sent from subscriber lines. The system comprises fixed wavelength converters 71-1–71-4 which are respectively coupled to input terminals 70-1–70-4 for converting the various wavelengths of optical signals from the subscribers to preassigned wavelengths $\lambda_1$ and $\lambda_2$, as illustrated. The outputs of wavelength converters 71-1 and 71-2 are coupled to a star coupler 72-1 in which they are wavelength-multiplexed and fed to $1 \times 2$ splitters 73-1 and 73-3, and those of wavelength converters 71-3 and 71-4 are wavelength-multiplexed by a star coupler 72-2 and fed to $1 \times 2$ splitters 73-1 and 73-4. Each of the splitters 73-1 and 73-2 has two output terminals which are coupled to respective inputs of $2 \times 1$ optical switches 74-1 and 74-2, whose outputs are connected to tunable wavelength filters 75-1 and 75-2, respectively. In like manner, each of the splitters 73-3 and 73-4 are coupled to optical switches 74-1 and 74-2, whose outputs are connected to tunable wavelength filters 75-3 and 75-4, respectively. Optical switches 74-1–74-4 and tunable wavelength filters 75-1–75-4 are controlled by a controller 77 to transmit signals from terminals 70-1–70-4 to output terminals 76-1–76-4. By coupling the outputs of switches 74-1 and 74-2 to upper and lower input terminals, respectively, and selecting wavelengths $\lambda_2$ and $\lambda_1$ from the outputs of switches 74-1 and 74-2, respectively, the optical signal from input terminal 70-2 is transmitted to output terminal 76-1 as indicated by a dotted line 78-2 and the signal from input terminal 70-3 is transmitted to output terminal 76-2 as indicated by a dotted line 78-3. Likewise, by coupling the outputs of switches 74-3 and 74-4 to lower and upper input terminals, respectively, and selecting wavelengths $\lambda_2$ and $\lambda_1$ from the outputs of switches 74-3 and 74-4, respectively, the optical signal from input terminal 70-1 is transmitted to output terminal 76-4 as indicated by a dotted line 78-1 and the signal from input terminal 70-4 as transmitted to output terminal 76-3 as indicated by a dotted line 78-4.

As described in connection with the first embodiment, the embodiment of FIG. 9 is also capable of broadcasting a signal from one of the input terminals to all output terminals.

Figure 10:
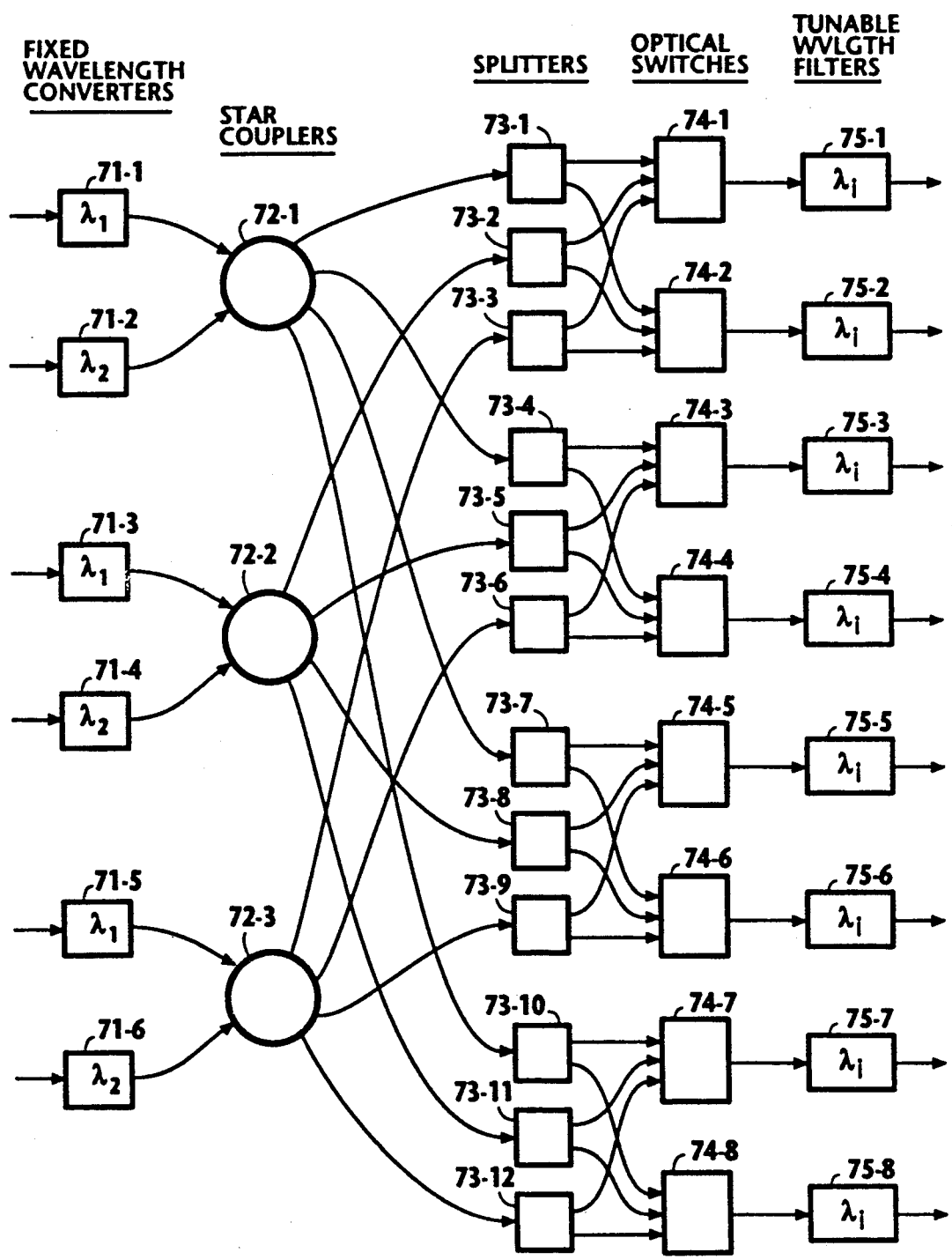
FIG. 10 is a block diagram of a 6×8 network of the fifth embodiment.

In a general configuration, a $(m_1 \times n) \times (m_2 \times n)$ network of the embodiment of FIG. 9 is shown in FIG. 10 in which $m_1=3$, $m_2=4$ and $n=2$. This $6 \times 8$ network comprises $m_1$ groups of n fixed wavelength converters 71-1–71-6, $m_1$ star couplers 72-1–72-3, $m_2$ groups of $m_1$ splitters 73-1–73-12, $m_2$ groups of n optical switches 74-1–74-8, and $m_2$ groups of n tunable wavelength converters 75-1–75-8 which are connected to switches 74-1–74-8, respectively. Star couplers 72 each have two inputs connected respectively to the converters 71 of the associated group and four outputs. Splitters of each group have single inputs connected respectively to the outputs of one of the star couplers 72. Each splitter 73 has n outputs connected to respective inputs of each optical switch 74 of the same group. It is seen that $(m_1 \times n)+(m_2 \times n)$ optical devices (converters 71 and filters 75) are required.

Figure 11:
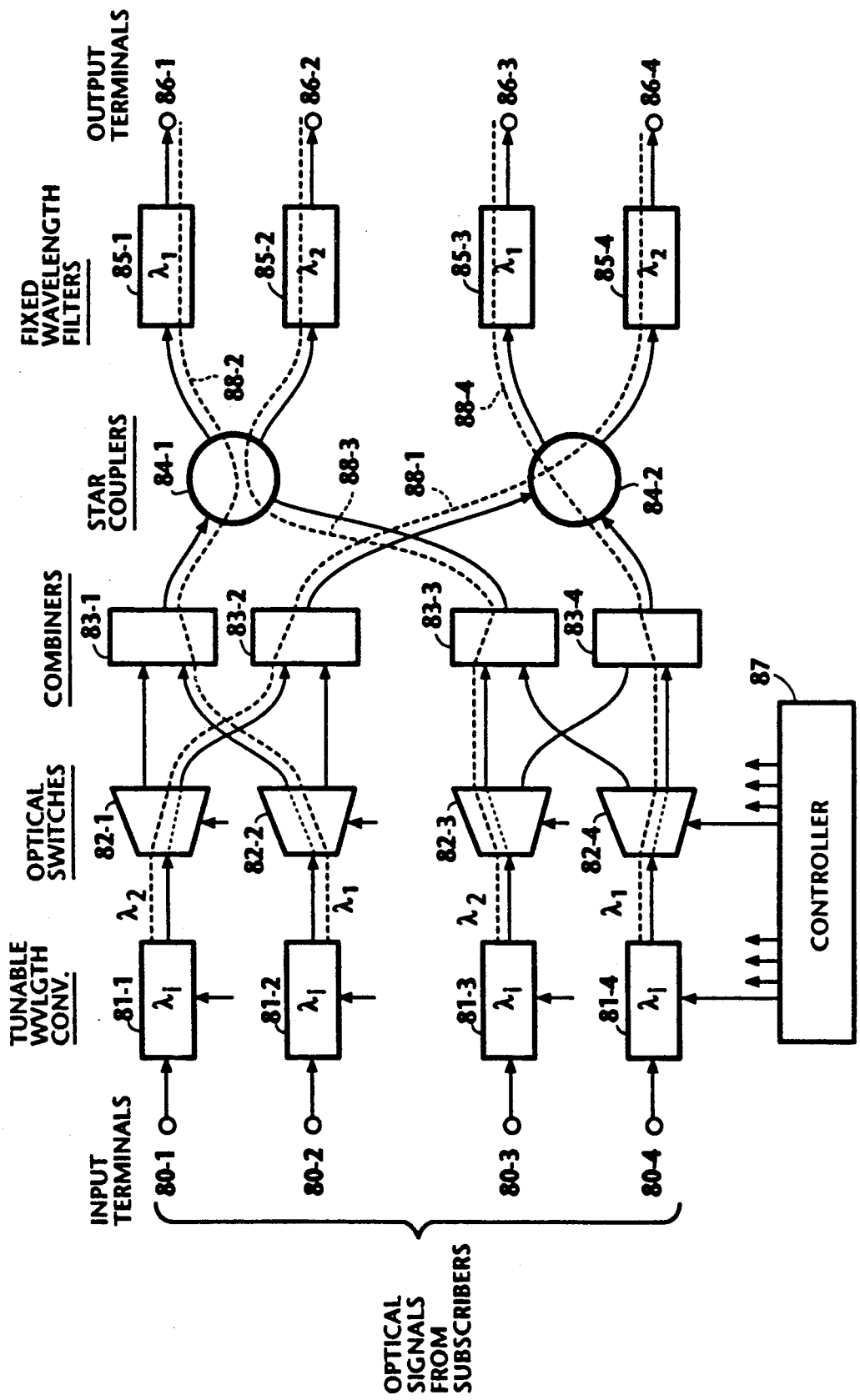
FIG. 11 is a block diagram of the wavelength division switching system of a sixth embodiment of this invention.

A modified configuration of the embodiment of FIG. 9 is shown in FIG. 11. In this modification, the system is made up of tunable wavelength converters 81-1–81-4 of the type of FIG. 6 to which optical signals from subscribers are applied and converted to either $\lambda_1$ or $\lambda_2$ in response to a control signal supplied from a controller 87. The outputs of wavelength converters 81-1–81-4 are respectively connected to $1 \times 2$ optical switches 82-1–82-4, the outputs of switches 82-1, 82-2 being coupled to respective inputs of $2 \times 1$ combiners 83-1, 83-2 and those of switches 82-3, 83-4 being coupled to respective inputs of $2 \times 1$ combiners 83-3, 83-4. The outputs of $2 \times 1$ combiners 83-1 and 83-3 wavelength-multiplexed by a star coupler 84-1 and fed to fixed wavelength filters 85-1 and 85-2, those of combiners 83-2 and 83-4 being likewise wavelength-multiplexed by a star coupler 84-2 and fed to fixed wavelength filters 85-3 and 85-4. Filters 85-1 and 85-2 select wavelengths $\lambda_1$ and $\lambda_2$, respectively, for coupling to output terminals 86-1, 86-2, and filters 85-3 and 85-4 select wavelengths $\lambda_1$ and $\lambda_2$, respectively, for coupling to output terminals 86-3, 86-4.

By converting the wavelength of signal from input terminal 80-1 to $\lambda_2$ by converter 81-1 and coupling its output through switch 82-1 to combiner 83-2, this signal is transmitted to output terminal 86-4 as indicated by a dotted line 88-1. Likewise, by converting the wavelength of signal from input terminal 80-2 to $\lambda_1$ by converter 81-2 and coupling its output through switch 82-2 to combiner 83-1, this signal is transmitted to output terminal 86-1 as indicated by a dotted line 88-2. By converting the wavelength of signal from input terminal 80-3 to $\lambda_2$ by converter 81-3 and coupling its output through switch 82-3 to combiner 83-3, this signal is transmitted to output terminal 86-2 as indicated by a dotted line 88-3, and by converting the wavelength of signal from input terminal 80-4 to $\lambda_2$ by converter 81-4 and coupling its output through switch 82-4 to combiner 83-4, this signal is transmitted to output terminal 86-3 as indicated by a dotted line 88-4.

It will be seen therefore that a $(m_1 \times n) \times (m_2 \times n)$ configuration of the system of FIG. 11 comprises $m_1 \times n$ tunable wavelength converters 81 which are organized into $m_1$ groups and associated respectively with the $m_1 \times n$ input terminals of the switching system for converting the wavelengths of optical signals appearing at the associated input terminals to one of n different wavelengths in response to a control signal applied thereto so that the converted wavelength is unique in each of the $m_1$ groups. An array of $m_1 \times n$ optical switches 82 are associated respectively with the tunable wavelength converters 81, each of the optical switches having $m_2$ outputs for coupling an optical signal supplied from the associated tunable wavelength converters 81 to one of its $m_2$ outputs in response to a switching signal applied thereto from controller 87. An array of $m_1 \times m_2$ combiners 83 are divided into $m_1$ groups which are associated respectively with the groups of the optical switches 82, each of the combiners 83 having n inputs coupled to respective outputs of the optical switches 82 of the associated group. An array of $m_2$ star couplers 84 are coupled to the combiners 83, respectively, and $m_2 \times n$ wavelength filters are divided into $m_2$ groups which are associated respectively with the star couplers 84 and with the output terminals 86 of the switching system. Each of the wavelength filters 85 is capable of passing one of the n different wavelengths of an optical signal supplied from the associated star coupler to the associated output terminal.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. A wavelength division switching system comprising:

$m_1$ inlet highways and $m_2$ outlet highways;

$m_1$ splitter means respectively associated with said inlet highways, each of said splitter means having $m_2 \times n$ outputs for coupling the associated inlet highway to the outputs of the splitter means, where n represents the number of wavelengths multiplexed into a input signal;

$m_2 \times n$ optical switches each having $m_1$ inputs coupled to respective outputs of different ones of said $m_1$ splitter means, and responsive to a switching control signal for coupling one of said $m_1$ inputs of the optical switch to an output of the optical switch;

$m_2 \times n$ tunable wavelength filters respectively associated with said optical switches, each of the tunable wavelength filters having an input coupled to the output of the associated optical switch for passing one of n different wavelengths through the filter to an output of the filter in response to a wavelength selecting signal;

$m_2 \times n$ fixed wavelength converters respectively associated with said tunable wavelength filters and organized into $m_2$ groups, each of the fixed wavelength filters being coupled to the output of the associated tunable wavelength filter for converting the wavelength of a signal from the associated filter to one of said wavelengths so that the converted wavelength is unique in each of said $m_2$ groups; and $m_2$ combiners respectively associated with the groups of said fixed wavelength converters and with said outlet highways, each of said combiners having n inputs coupled to respective outputs of the fixed wavelength converters of the associated group and multiplexing signals appearing at said n inputs of the combiner into a wavelength multiplexed output signal for coupling to the associated outlet highway.

2. A wavelength division switching system as claimed in claim 1, wherein each of said $m_1$ splitter means comprises:
   a first splitter having a single input coupled to the associated inlet highway and $m_2$ outputs; and
   $m_1$ second splitters each having a single input connected to one of the outputs of the first splitter which is associated with a different one of said inlet highways and n outputs connected to respective inputs of said optical switches.

3. A wavelength division switching system comprising:
   $m_1$ inlet highways and $m_2$ outlet highways;
   $m_1$ splitters respectively associated with said inlet highways, each of said splitters having n outputs for coupling the associated inlet highway to the outputs of the splitter, where n represents the number of wavelengths which are multiplexed into a input signal;
   $m_1 \times n$ fixed wavelength filters organized into $m_1$ groups associated respectively with said $m_1$ splitters, each of said fixed wavelength filters being coupled to a respective output of the associated splitter for passing one of n different wavelengths to an output of the fixed wavelength filter so that the passed wavelength is unique in each of said $m_1$ groups;
   $m_1 \times n$ tunable wavelength filters coupled respectively to the outputs of said fixed wavelength filters, each of said tunable wavelength filters being capable of passing one of said wavelengths to an output of the tunable wavelength filter in response to a wavelength selecting signal;
   $m_1 \times n$ optical switches each having an input coupled to the output of a respective one of said tunable wavelength filters and $m_2$ outputs for coupling the input of the optical switch to one of said $m_2$ outputs of the optical switch in response to a switching signal; and
   $m_2$ combiner means respectively associated with said outlet highways, each of said combiner means having $m_1 \times n$ inputs coupled to respective outputs of different ones of the optical switches for multiplexing signals appearing at said $m_1 \times n$ inputs of the combiner means to produce a wavelength multiplexed signal for coupling to the associated outlet highway.

4. A wavelength division switching system as claimed in claim 3, wherein said $m_2$ combiner means associated respectively with said $m_1$ groups of n optical switches and each combiner means comprises:
   $m_1$ first combiners each having n inputs coupled to respective outputs of the optical switches of the associated group and a single output; and
   a second combiner having $m_1$ inputs connected respectively to the outputs of said first combiners associated respectively with different groups of said optical switches and a single output connected to the associated outlet highway.

5. A wavelength division switching system comprising:
   $m_1 \times n$ input terminals for receiving optical signals from incoming optical transmission channels and $m_2 \times n$ output terminals for delivering optical signals to outgoing transmission channels;
   $m_1 \times n$ fixed wavelength converters organized into $m_1$ groups, each of said fixed wavelength converters being coupled to a respective one of said input terminals for converting the wavelength of the optical signal from the respective input terminal to one of n different wavelengths so that the converted wavelength is unique in each of said $m_1$ groups;
   $m_1$ star couplers associated respectively with the groups of the fixed wavelength converters, each of the star couplers being coupled to outputs of the fixed wavelength converters of the associated group;
   $m_2 \times m_1$ splitters organized into $m_2$ groups, the splitters of each group being coupled to said star couplers respectively, each of said splitters having n outputs;
   $m_2 \times n$ optical switches organized into $m_2$ groups associated respectively with the groups of said splitters, each optical switch having $m_1$ inputs coupled to respective outputs of the optical switches of the associated group and an output for coupling one of said $m^1$ inputs of the optical switch to the output of the optical switch in response to a switching signal; and
   $m_2 \times n$ tunable wavelength converters organized into $m_2$ groups associated respectively with the groups of the optical switches, each of the tunable wavelength converters having an input coupled to a respective one of the outputs of said optical switches of the associated group and an output coupled to a respective one of said output terminals for converting the wavelength of a signal supplied to the input of the tunable wavelength converter to one of said wavelengths in response to a control signal so that the converted wavelength is unique to each of the $m_2$ groups of the tunable wavelength filters.

6. A wavelength division switching system comprising:
   $m_1 \times n$ input terminals for receiving optical signals from incoming transmission channels and $m_2 \times n$ output terminals for delivering optical signals to outgoing transmission channels;
   $m_1 \times n$ tunable wavelength converters organized into $m_1$ groups, each of the tunable wavelength converters being coupled to a respective one of said input terminals for converting the wavelength of the optical signal from the respective input terminal to one of n different wavelengths in response to a control signal so that said converted wavelength is unique in each of said $m_1$ groups;
   $m_1 \times n$ optical switches organized into $m_1$ groups, each of the optical switches having an input coupled to an output of a respective one of said tunable wavelength converters and $m_2$ outputs for coupling the input of the optical switch to one of the $m_2$ outputs of the optical switch in response to a switching signal;
   $m_1 \times m_2$ combiners organized into $m_1$ groups associated respectively with the groups of said optical switches, each of said combiners having n inputs coupled to respective outputs of the optical switches of the associated group;

$m_2$ star couplers coupled to outputs of said combiners of different groups, respectively; and $m_2 \times n$ fixed wavelength filters organized into $m_2$ groups associated respectively with said star couplers, each of the fixed wavelength filters being coupled to the associated star coupler for passing one of said n different wavelengths through the filter to a respective one of said output terminals so that the passed wavelength is unique in each of the $m_2$ groups of the fixed wavelength filters.

* * * * *

UNITED STATES PATENT AND TRADEMARK OFFICE
CERTIFICATE OF CORRECTION

PATENT NO. : 5,194,977
DATED : March 16, 1993
INVENTOR(S) : Makoto NISHIO It is certified that error appears in the above-identified patent and that said Letters Patent is hereby corrected as shown below:

Col. 1, line 36, delete "m." and insert --$m_2$--;

Col. 7, line 3, delete "$\lambda_1$" and insert --$\lambda_i$--;

Col. 8, line 21, delete "38-1" and insert --38-2--.

Col. 8, line 36, delete "n ultiplexity" and insert --multiplexity--;

Col. 8, line 49, delete "73-1" and insert --73-2--.

Signed and Sealed this

Twenty-second Day of March, 1994

Attest:

BRUCE LEHMAN

*Attesting Officer*     *Commissioner of Patents and Trademarks*